United States Patent
Bier et al.

(10) Patent No.: US 11,063,417 B2
(45) Date of Patent: *Jul. 13, 2021

(54) CABLE CAP

(71) Applicant: Richards Manufacturing Company, a New Jersey Limited Partnership, Irvington, NJ (US)

(72) Inventors: Joseph Bier, Warren, NJ (US); Christopher A. Juillet, Warren, NJ (US); Jeff Madden, Bernardsville, NJ (US)

(73) Assignee: Richards Manufacturing Company, a New Jersey Limited Partnership, Irvington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,736

(22) Filed: Nov. 21, 2019

(65) Prior Publication Data

US 2020/0091699 A1    Mar. 19, 2020

Related U.S. Application Data

(63) Continuation of application No. 15/895,496, filed on Feb. 13, 2018, now Pat. No. 10,498,128.

(60) Provisional application No. 62/465,373, filed on Mar. 1, 2017.

(51) Int. Cl.
*H02G 15/04* (2006.01)
*H02G 15/013* (2006.01)

(52) U.S. Cl.
CPC ......... *H02G 15/043* (2013.01); *H02G 15/013* (2013.01)

(58) Field of Classification Search
CPC .......................... H02G 15/013; H02G 15/043
See application file for complete search history.

(56) References Cited

U.S. PATENT DOCUMENTS

| | | | |
|---|---|---|---|
| 2,585,602 A * | 2/1952 | Turner | A01K 97/08 220/796 |
| 3,992,570 A * | 11/1976 | Beinhaur | F16L 17/10 174/135 |
| 4,029,895 A | 6/1977 | Scarborough | |
| 5,439,031 A * | 8/1995 | Steele | F16L 55/1116 138/178 |
| 5,753,861 A | 5/1998 | Hansen et al. | |
| 6,359,226 B1 | 3/2002 | Biddell et al. | |
| 9,876,339 B2 | 1/2018 | Teal | |
| 9,985,425 B2 | 5/2018 | Yamasaki et al. | |
| 10,498,128 B2 * | 12/2019 | Bier | H02G 15/043 |
| 2004/0016564 A1 | 1/2004 | Lambert | |
| 2006/0254799 A1 | 11/2006 | Gregorek | |
| 2011/0136396 A1 * | 6/2011 | Burwell | H02G 15/046 439/750 |
| 2015/0357810 A1 | 12/2015 | Yamasaki et al. | |

* cited by examiner

*Primary Examiner* — Chau N Nguyen
(74) *Attorney, Agent, or Firm* — Brown Rudnick LLP; Ian G. DiBernardo

(57) ABSTRACT

The present invention provides, in various embodiments, a push on cap for an electrical cable that can be both temporary and permanent. The cap includes an extension that can be folded back for temporary installation of the cap on the cable, and unfolded onto the cable for permanent installation.

8 Claims, 3 Drawing Sheets

CABLE CAP

RELATED APPLICATIONS

This application is a continuation of U.S. application Ser. No. 15/895,496, filed Feb. 13, 2018, which claims the benefit of U.S. Provisional Application No. 62/465,373, filed Mar. 1, 2017, each of which is incorporated by reference herein in its entirety.

BACKGROUND

Cable end caps are useful in various electrical applications to seal exposed cable ends and protect them from environmental damage such as moisture, contamination, corrosion, etc.

SUMMARY

The present invention relates to a push on cap for an electrical cable that can be both temporary and permanent. The cap includes an extension that can be folded back for temporary installation of the cap on the cable, and unfolded onto the cable for permanent installation.

In some embodiments, the invention provides a push on cap for a cable that can be both temporary and permanent, comprising a cap body having a sealing mastic bonded to an inner surface thereof, and wherein the cap comprises: an extension portion configured to be folded back to expose the mastic when the cap is free or temporarily installed on the cable; and one or more pull tabs configured to be pulled to unfold the extension portion onto the cable and seal the mastic thereto when the cap is permanently installed on the cable.

In some embodiments, the cap body comprises rubber.

In some embodiments, the cable is a secondary (low voltage) cable.

In some embodiments, the cap mates with a cable jacket on the cable.

In some embodiments, the cap comprises two pull tabs positioned opposite one another.

In some embodiments, the cap is configured to be friction fit to an exposed end of the cable when the cap is temporarily installed on the cable.

In some embodiments, the mastic forms a water-tight seal with the cable when the cap is permanently installed on the cable.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the device of the present application, there are shown in the drawings preferred embodiments. It should be understood, however, that the application is not limited to the precise arrangements and instrumentalities shown. In the drawings.

DETAILED DESCRIPTION

Cable end caps can be push on, heat shrink, or cold shrink. Push on caps are temporary or need additional taping to keep them in place. Heat shrink caps are permanent and cheap, but they are not adapted for temporary use and they require use of a torch in the manhole, which is something that utilities are trying to move away from. Cold shrink caps are also permanent, but tend to be very expensive.

The present invention addresses the above-described drawbacks identified in existing cable end caps, and provides, in various embodiments, improved cable end caps that are economical and have the option of being temporary or permanent.

Figure 1:
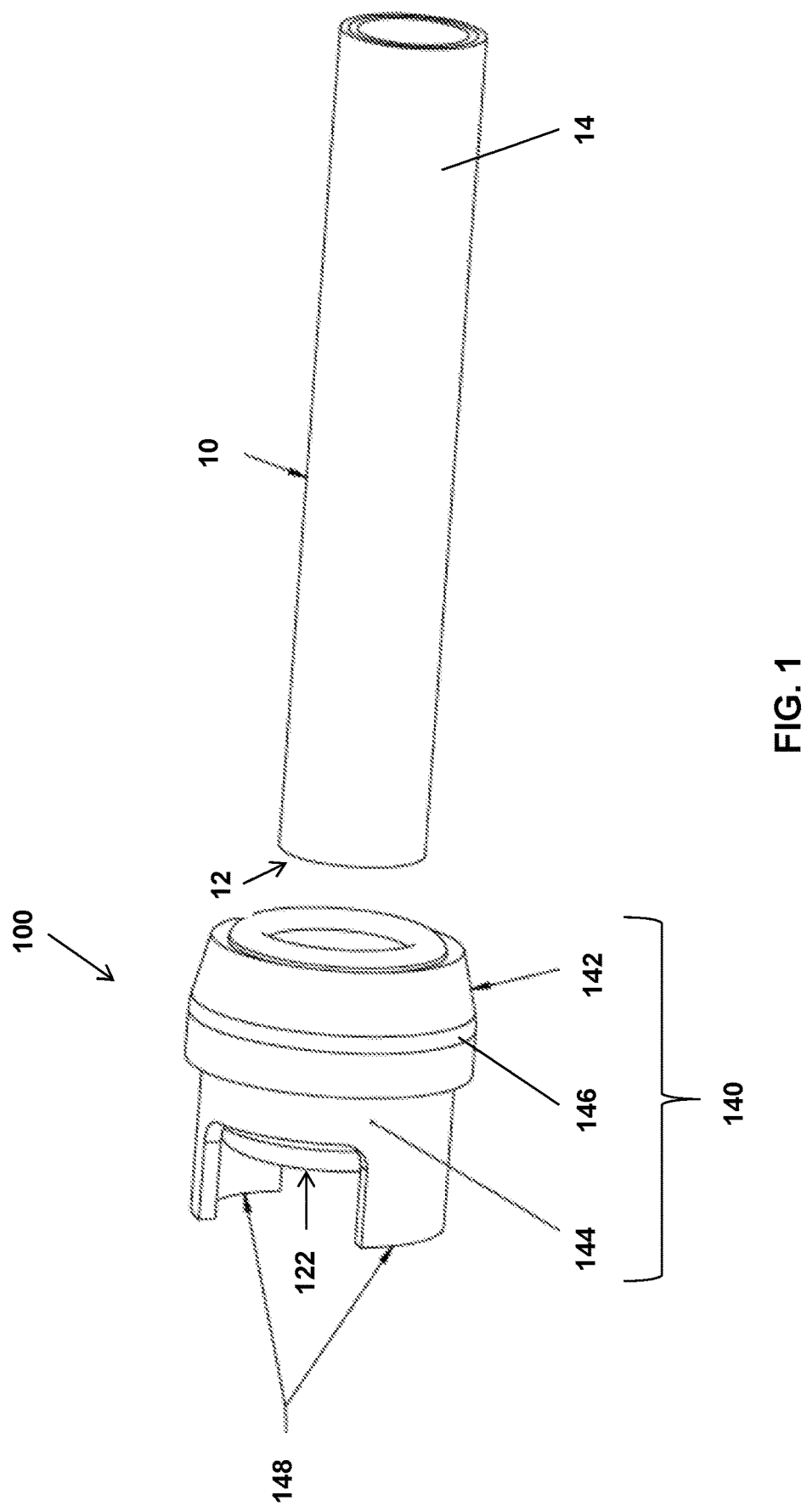
FIG. 1 shows a push on cap for a secondary cable in a folded-up form, separate from the cable, according to some embodiments of the invention.
Figure 2:
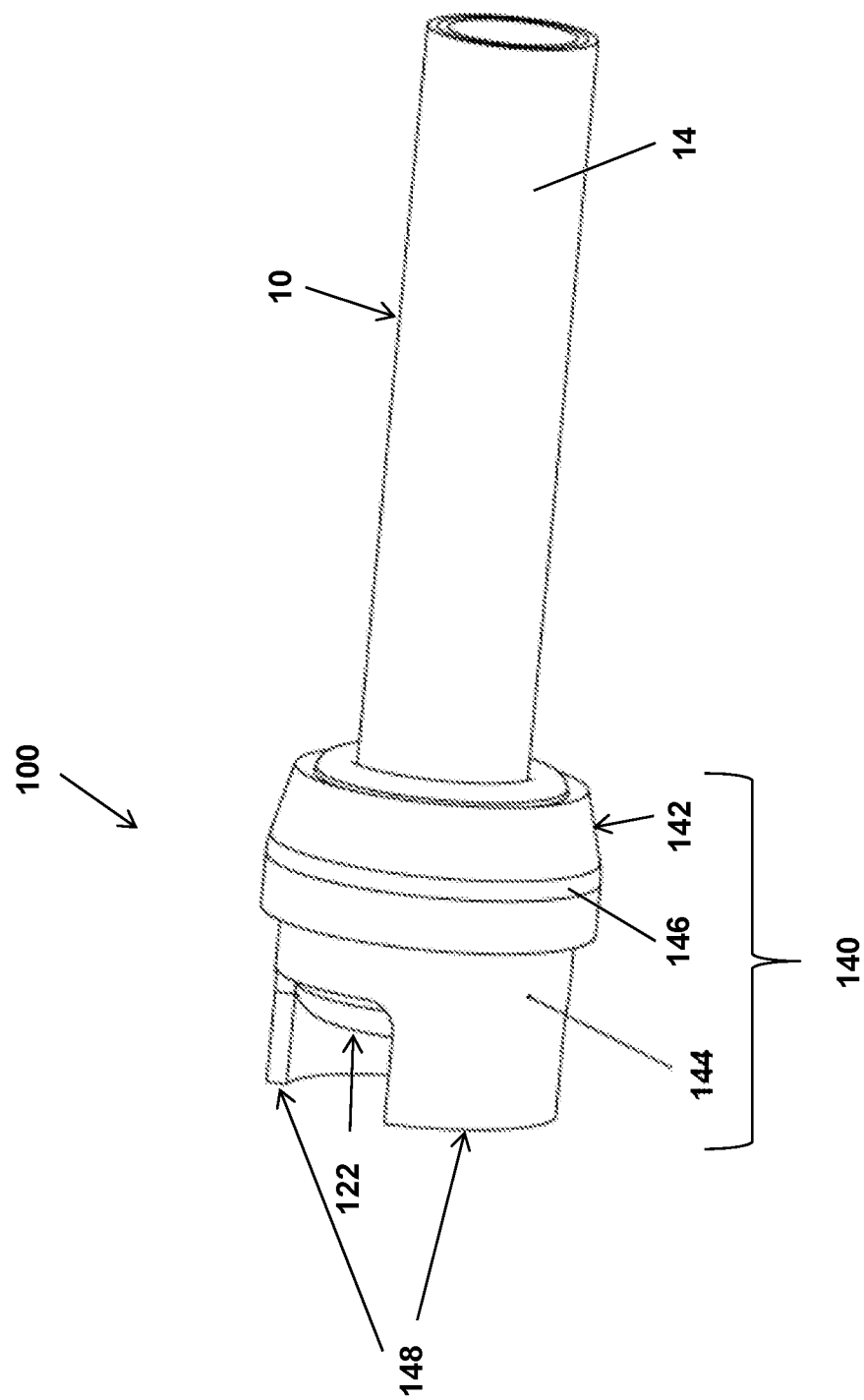
FIG. 2 shows a push on cap for a secondary cable in a folded-up form, temporarily installed on the cable, according to some embodiments of the invention.
Figure 3:
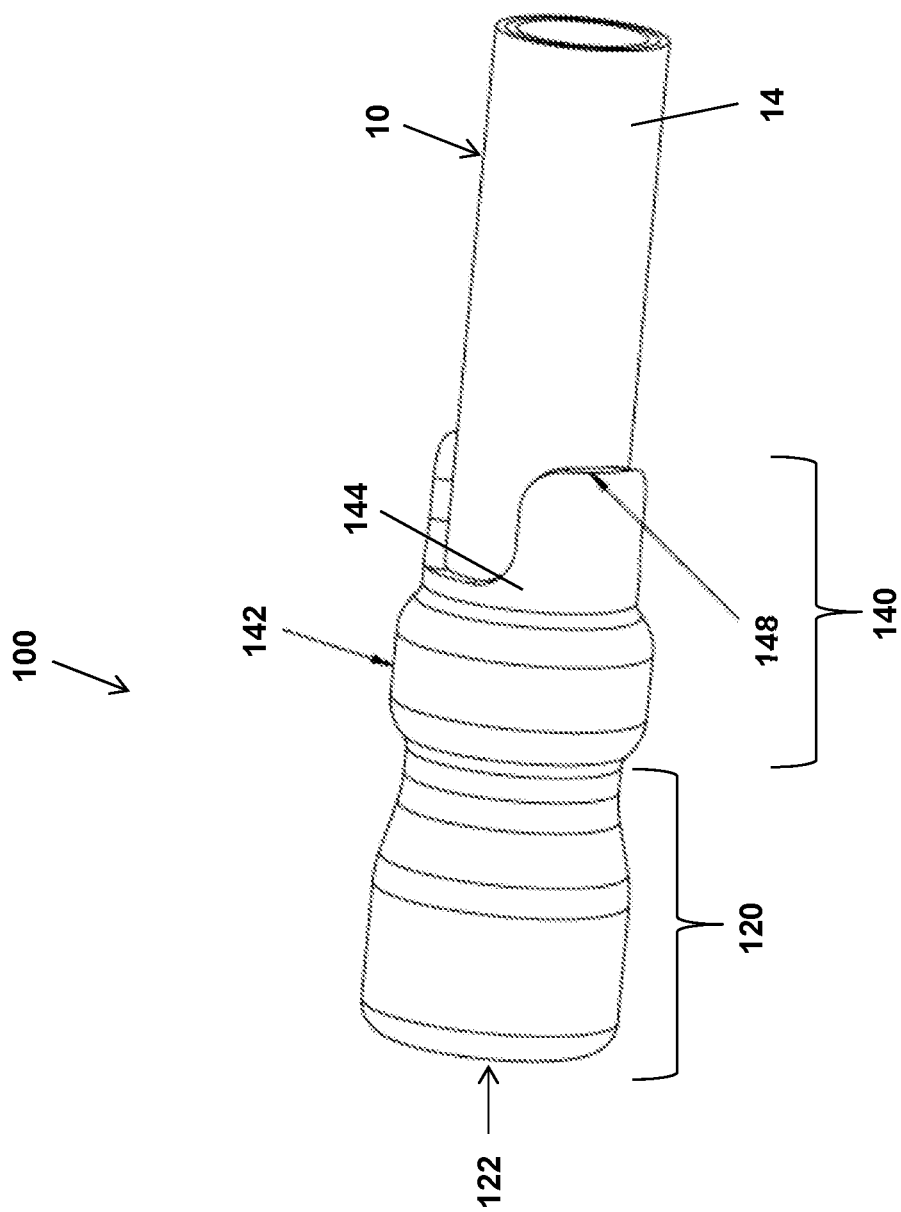
FIG. 3 shows a push on cap for a secondary cable in an extended form, permanently installed on the cable, according to some embodiments of the invention.

In some embodiments, the present invention provides a cable cap 100 as shown, for example, in FIGS. 1-3. Cable cap 100 is configured to cover an exposed end 12 of a cable 10 such as, but not limited to, a secondary (low voltage) cable. Cable cap 100 is configured to mate with the cable jacket 14 and provide a seal that can keep out water, dirt, air, etc.

In some embodiments, cable cap 100 comprises a rubber cap, for example, made of ethylene propylene rubber. In other embodiments, other elastomeric rubber materials may be used to form the cable cap, such as, but not limited to, neoprene rubber, nitrile rubber, silicone rubber, EPDM rubber, etc.

In some embodiments, as shown, for example, in FIG. 3, the invention provides an insulated rubber cap comprising a main cap body 120 with a closed cap end 122, and an extension portion 140 having a middle section 142 and an end section 144. The extension portion 140 can be folded back over the cap body 120 as shown, for example, in FIG. 1 and FIG. 2. In the folded-back position, extension 140 covers the outer surface of cap body 120 at least partially, and the inner surface of extension 140 is exposed. On the inner surface of extension 140 (which faces outside when the extension is folded back as shown in FIG. 1 and FIG. 2) is a strip of sealing mastic 146 bonded to the rubber. The mastic sealant can cure in an elastic state, and can provide a flexible yet durable seal. Pull tabs 148 can be included on the end section 144 of extension portion 140 to assist in unfolding the extension 140 onto the cable 10. Two pull tabs 148 are shown, which are positioned opposite one another and formed integrally with end section 144; however, in other embodiments, different numbers, arrangements and/or types of pull tabs may be provided.

The cable cap of the present invention can be both temporary and permanent. For example, while the extension portion 140 is folded back, the cap 100 can be reversibly pushed on and pulled off an end of a cable 10. As shown, for example, in FIG. 2, cap 100 can be temporarily installed on an end of cable 10 by means of an interference (friction) fit, for temporary sealing/insulating.

When the extension portion 140 is unfolded, the cap 100 can be irreversibly fixed to the end of the cable 10. As shown, for example, in FIG. 3, when the tabs 148 are pulled away from the closed cap end 122 to unfold the extension 140 onto the cable 10, the mastic 146 is then oriented on the inside of the cap 100 and seals against the cable jacket 14. The mastic 146, on the inner surface of middle section 142 of extension 140, is sandwiched between the cap 100 and the cable 10 when the extension 140 is unfolded, forming a water-tight seal. Thus, the cap 100 becomes permanently installed on the cable 10, and would have to be cut off to be removed.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

The invention claimed is:

1. A cap for covering an exposed end of a cable, wherein the cap is a push on cap, not a heat shrink cap or a cold shrink cap, the cap consisting essentially of an elastomeric rubber material and a sealing mastic both when temporarily installed on the cable and when permanently installed on the cable, the sealing mastic positioned on a middle section of the cap, wherein the cap is configured to provide an interference fit without engaging the sealing mastic when the cap is in a folded form and temporarily installed on the cable, and wherein the cap is configured to provide a water-tight seal using the sealing mastic when the cap is in an extended form and permanently installed on the cable, wherein when the cap is in the extended form and permanently installed on the cable it is irreversibly fixed to the end of the cable and would have to be cut off to be removed.

2. The cap of claim 1, wherein the elastomeric rubber material comprises ethylene propylene rubber.

3. The cap of claim 1, wherein the sealing mastic is bonded to the rubber.

4. The cap of claim 1, wherein the sealing mastic is cured in an elastic state.

5. The cap of claim 1, wherein the cap is configured for a secondary (low voltage) cable.

6. The cap of claim 1, wherein in the folded form a portion of the cap is folded back exposing the sealing mastic.

7. The cap of claim 1, wherein in the extended form the cap is unfolded onto the cable positioning the sealing mastic against the cable jacket.

8. A push on cap for a cable that can be both temporary and permanent, the cap consisting essentially of an elastomeric rubber material and a sealing mastic both when temporarily installed on the cable and when permanently installed on the cable, the elastomeric rubber material forming a cap body having a closed cap end; and an extension portion having a middle section and an end section, the middle section of the extension portion having the sealing mastic bonded to an inner surface thereof, and the end section of the extension portion including one or more pull tabs, wherein the extension portion is configured to be folded back over at least a portion of the cap body to expose the mastic when the cap is free or temporarily installed on the cable; and wherein the one or more pull tabs are configured to be pulled to unfold the extension portion onto the cable and seal the mastic thereto when the cap is permanently installed on the cable.

\* \* \* \* \*